3,407,081
NOBLE METAL PASTE COMPOSITIONS COMPRISING NOVEL LIQUID CARRIERS
Kermit H. Ballard, Lewiston, N.Y., assignor to E. I. du Pont de Nemours and Company, Wilmington, Del., a corporation of Delaware
No Drawing. Continuation-in-part of application Ser. No. 451,037, Apr. 26, 1965. This application Sept. 20, 1967, Ser. No. 669,310
12 Claims. (Cl. 106—1)

ABSTRACT OF THE DISCLOSURE

The novel noble metal paste compositions, which can be applied to green ceramic dielectric sheets in the production of capacitors, are dispersions of a particulate noble metal(s) in a liquid carrier comprising a solution of a polyterpene resin in an aliphatic petroleum naphtha having a boiling point in the range of 150 to 360° C.

CROSS-REFERENCES TO RELATED APPLICATIONS

This is a continuation-in-part of U.S. patent application Ser. No. 451,037, filed Apr. 26, 1965, now abandoned.

BACKGROUND OF THE INVENTION

Deyrup U.S. Patent 2,389,420 describes the preparation of multiplate monolithic ceramic capacitors employing a technique involving spraying a slurry of a finely divided ceramic dielectric material onto a base surface, drying the same, then superimposing thereon a layer of finely divided conductive metal, e.g., silver, in paste form. The silver layer is usually applied by screen stencilling the silver paste in the desired pattern, later to serve as the capacitor electrode or plate. As many alternate layers as desired of ceramic dielectric and silver electrodes may be built up in this manner, with the bottom-most and the upper-most layers being dielectric layers. Alternate silver layers are offset slightly so as to be exposed at opposite sides of the capacitor structure, which structure is then fired at the fusing or sintering temperature of the dielectric material to form a monolithic capacitor structure. The alternate electrode layers or plates exposed at opposite sides of the fired capacitor are then silvered with a silver paste or paint. After again being fired, the fired silvered edge on one side connects all alternate plates exposed on that side, while the opposite silvered edge similarly connects all alternate plates exposed on that side. Lead wires are then attached, e.g., by soldering, to the silvered edges. Alternatively, silvering of the edges to which the alternate silver layers are exposed can be effected before the first firing, in which case only a single firing is necessary.

An improved modification of the method of the above patent involves the use of thin preformed sheets, films or strips of "green" ceramic dielectric material. Such sheets are first coated, e.g., by screen stencilling, with a noble metal electrode coating in the desired pattern, following which the sheets are stacked to provide alternate dielectric and electrode layers, with alternate electrode layers exposed on opposite edges of the stack. The stack is compressed under a pressure of about 100 to 500 p.s.i., then fired to provide the monolithic multiplate capacitor. The noble metal component of the electrode used should be a metal which will not melt at the firing temperature. The edges with exposed electrodes are metallized using a conductive metal paint. This can be done before the stack is fired, or after such firing, depending upon the firing temperature required and the metal paint used. If the edges are so metallized after the stack is fired, a second firing will be required to fire such conductive paint to the edges.

By "green" vitreous dielectric material is meant an unfired admixture, e.g., in a preformed shape such as a sheet, film or strip, comprising a particulate vitreous dielectric material such as glass, barium titanate, lead zirconate and titanium dioxide, and a temporary resinous organic binder therefor. The particulate conductive metal component of the electrode pastes employed in forming the electrode coating is generally a noble metal such as silver, gold, palladium, platinum, rhodium, ruthenium, osmium or iridium, or mixtures or alloys of two or more thereof.

The organic binder component of the green dielectric sheet should have good burning properties and should yield a sheet which is flexible, otherwise, cracks and other defects occur during their handling. It is also highly important if not essential that the liquid carrier in which the noble metal electrode material is applied to the green dielectric sheet not be a solvent for the resinous organic binder component of the green dielectric sheet, otherwise, objectionable curling, cracking, and/or deformation of the electrode coated sheets result during the stacking, compressing and firing operations.

Accordingly, it is highly desirable to provide improved noble metal electrode paste compositions especially adapted for application to green ceramic dielectric sheets in the production of fired multiplate monolithic capacitors. More particularly, it is desirable to provide improved noble metal electrode paste compositions which can be applied to green ceramic dielectric sheets in the production of such capacitors without causing the curling, blistering, cracking or penetration of such sheets.

SUMMARY OF THE INVENTION

The improved noble metal electrode paste compositions of the invention are dispersions of a particulate noble metal, a mixture of two or more noble metals, an alloy of two or more noble metals, or a mixture of two or more such alloys, in a liquid carrier comprising a solution of a polyterpene resin in an aliphatic petroleum naphtha having a boiling point or boiling range in the range 150 to 360° C.

The noble metal pastes of this invention are useful in the production of highly reliable capacitors which do not possess the previously described disadvantages of the prior art.

DESCRIPTION OF THE PREFERRED EMBODIMENTS

The polyterpene resins dissolve readily in the aliphatic petroleum naphthas of the above type to produce solutions or carrier liquids which are well suited for use as carriers for the particulate noble metal electrode materials in the application of the latter to green dielectric ceramic sheets. The latter generally comprise thin flexible sheets of mixtures of a particulate ceramic dielectric material and a temporary organic resin binder which is most generally a solid ethyl cellulose resin, or a solid polymer of an acrylate or methacrylate ester of a 1 to 4 carbon aliphatic alcohol. Such resins are favored as temporary binders for the ceramic particles because they possess excellent burning properties and yield flexible green sheets which handle well. These resins are insoluble in the carrier liquid component of the present noble metal compositions. Accordingly, application of the electrode compositions of the invention in the formation of electrode patterns onto the thin green ceramic dielectric sheets has no deleterious effect upon such sheets during their handling in the stacking and compressing operations, and the resulting assembly of stacked and compressed sheets can be fired according to usual firing practices to burn out all organic matter and produce well-formed, highly satisfactory monolithic capacitor structures.

The solvent component of the liquid carriers for the particulate noble metal must be an aliphatic petroleum naphtha. Aromatic hydrocarbons and the common alcohols, ketones, esters, nitriles and the like are generally unsatisfactory as solvents in that they will generally exert a substantial solvent effect upon the ethyl cellulose and the polyacrylate and polymethacrylate resins used as the temporary binders in the green sheets. The use of a water-soluble binder in the green sheet, which binder would be insoluble in an organic liquid carrier for the noble metal electrode material, has not proved to be satisfactory. This is because effective plasticizers for such water-soluble binders are not available and, without plasticization, green sheets formulated with such water-soluble binders undergo excessive curling and cracking during handling.

The liquid carrier for the particulate noble metal must include a temporary binder for the metal particles, which binder must be soluble in the aliphatic petroleum naphtha solvent. The binder must also be one which will volatilize or burn out clearly during firing. I have found that the polyterpene resins having a molecular weight of from about 350 to 870 are highly satisfactory binder materials. They are commercially available resins sold under the trade designation "Nirez" polyterpene resins. Those having molecular weights of from 550 to 800 are preferred.

The polyterpene resin should be present in the liquid carrier employed in an amount sufficient to bind effectively the noble metal particles together and to the green dielectric sheet during handling. Amounts equal to 20 to 75% of the total weight of the liquid carrier are generally effective; the preferred amounts are 30 to 70%. The solvent should generally constitute essentially the remainder of the liquid carrier and should be sufficient in amount to impart the desired fluidity to the liquid noble metal electrode composition. Insoluble particulate solid organic or inorganic diluents, e.g., corn starch or barium titanate, may be added in amounts to produce proper paste rheology, particularly when an electrode composition having a relatively low noble metal content is desired. Generally, the noble metal content of the electrode composition will range from 45 to 70% by weight. The preferred metal contents range from 50 to 65%, and when these preferred amounts are employed, the use of solid diluents such as starch is seldom required.

As indicated previously, the aliphatic petroleum naphtha used as the solvent component of the liquid carrier should have a boiling point or boiling range (at atmospheric pressure) within the range 150 to 360° C. Lower boiling solvents volatilize too rapidly while higher boiling solvents volatilize too slowly for practical use. Kerosene and diesel fuel grades having boiling ranges within the above ranges are examples of suitable naphthas. Also, any mineral oil having a boiling point within the range of 150 to 360° C. may be utilized. For example, a commercial mineral oil such as "Nujol" is suitable. The preferred naphthas boil within the range 150 to 320° C. and most preferably within the range of 170 to 275° C.

In use, the noble metal electrode paste composition is applied to the green dielectric ceramic sheet in the desired pattern, e.g., by screen stencil printing or in any other suitable manner, following which the solvent component of the noble metal paste coating will usually be essentially completely evaporated from the coating before the coated sheets are stacked, compressed and fired. However, in some instances the coated sheets are stacked before the solvent is evaporated, since the presence of the solvent assists in holding the sheets together before and during the compression and early firing operations.

In the following examples and elsewhere in the application, all amounts and contents expressed as parts or percentages are by weight.

The following are examples of liquid carrier compositions which are suitable for use in formulating the noble metal electrode compositions of the invention. The polyterpene resin component used was "Nirez" #1085, a commercial polypinene resin having a molecular weight of about 580.

| Liquid Carrier Composition | A | B | C | D |
|---|---|---|---|---|
| "Nirez" #1085 resin, percent | 69 | 70 | 70 | 60 |
| Kerosene (B.R. 177–271° C.), percent | 31 | | | |
| Aliphatic petroleum naphtha (B.R. 188–239° C.), percent | | 30 | | |
| Aliphatic petroleum naphtha (B.R. 220–238° C.), percent | | | 30 | |
| Diesel fuel #208 (B.R. 204–315° C.), percent | | | | 40 |

The above compositions were prepared by sifting the pulverized resin into the solvent while the latter was being stirred, then continuing the stirring at 39–52° C. until the resin was completely dissolved.

The solvents employed in the above compositions varied considerably as to their rates of drying or evaporating. Thus, when 10 gram portions of the solvents used in compositions A, B, C and D were placed on watch glasses (5 inches in diameter) at room temperature in still air, the proportions evaporated in 64 hours were 75, 70, 43 and 20% respectively.

The following silver electrode paste compositions were prepared by mixing appropriate proportions of powdered silver and one of the above carrier liquids in a 3-roll paint mill to effect thorough dispersion of the silver in the carrier liquid. If the viscosity of the resulting paste is somewhat higher than desired, it can be lowered as desired by adding suitable amounts of the appropriate naphtha solvent. These paste compositions are suitable for use when the green ceramic sheet to which they are to be fired is formulated using a low firing ceramic dielectric such as a glass.

SILVER ELECTRODE PASTE COMPOSITIONS FOR LOW FIRING CERAMIC DIELECTRICS

| | Weight Percent | | | |
|---|---|---|---|---|
| Example | 1 | 2 | 3 | 4 |
| Silver powder | 60 | 60 | 60 | 60 |
| Carrier liquid A | 40 | | | |
| Carrier liquid B | | 40 | | |
| Carrier liquid C | | | 40 | |
| Carrier liquid D | | | | 40 |

The following are examples of noble metal electrode paste compositions suitable for use when the green sheet is formulated of a high firing ceramic dielectric.

NOBLE METAL ELECTRODE PASTE COMPOSITIONS FOR HIGH FIRING CERAMIC DIELECTRICS

| | Weight Percent | | | |
|---|---|---|---|---|
| Example | 5 | 6 | 7 | 8 |
| Rhodium powder | 65 | | | |
| Palladium powder | | 65 | | |
| Platinum powder | | | 65 | |
| Gold powder | | | | 65 |
| Carrier liquid A | 35 | | | |
| Carrier liquid B | | 35 | | |
| Carrier liquid C | | | 35 | |
| Carrier liquid D | | | | 35 |

A low firing ceramic dielectric is one whose ceramic particles will fuse or sinter to form a rigid consolidated dielectric body at a temperature not higher than 950° C. A high firing dielectric is one which requires a substantially higher firing temperature. While any of the present noble metal electrode paste compositions can be used with green sheets made of a low firing dielectric, silver electrode pastes are unsuitable for use with green sheets made of high firing dielectric materials, since silver melts at a temperature (961° C.) below the temperatures required to fire such latter sheets.

Example 9

A flexible self-supporting green sheet of a low firing glass dielectric is prepared as follows: a glass frit is made by melting together 45.4 parts PbO, 23.6 parts $SiO_2$, 3.9 parts $K_2CO_3$, 3.9 parts NaF, 7.5 parts $MgCO_3$, 1.6 parts $Li_2CO_3$, 2.4 parts $Na_2CO_3$ and 11.7 parts $Sr(NO_3)_2$ until a clear fluid melt is obtained, which is fritted by pouring the melt into water. The resulting coarse frit is ball milled for 16 hours in a porcelain mill with porcelain balls and about ⅓ its weight of water, filtered, dried and crushed to a powder having an average particle size of about 5 microns. This frit is slurried in such an amount of a 10% solution of ethyl cellulose (200 cps.) in acetone as will provide an amount of ethyl cellulose equal to 10% of the weight of the frit. The slurry is cast on a clean glass slab which had been previously coated with dilorol phosphate, a stripping agent, using a doctor blade that gives a film 5 mils thick. After drying and stripping from the glass slab, the flexible green sheet will have a thickness of about 4 mils.

Using the screen stencil technique, ½" x 1" electrode patterns of the silver electrode paste of Example 1 are printed upon several sections of the above green dielctric sheet. After drying, the printed sheets (sections) are stacked so that about ⅞" of the patterns on successive sheets overlap, with about ⅛" of the pattern of alternate sheets extending to the right beyond the overlap area, and with about ⅛" of the pattern of the remaining sheets extending to the left beyond the overlap area. After 8 (or any desired number) printed sheets have been stacked or "built up" in this manner with an unprinted top or cover sheet, the stack is carefully compressed under a pressure of about 300 p.s.i., then die cut so as to expose the electrode prints of alternate sheets on opposite ends of the stack. The opposite ends with the exposed alternate electrode prints are painted with a silver paint and the stack is then slowly fired on an ethyl cellulose coated stainless steel plate from room temperature to 760° C. over a period of 16 hours.

The resulting monolithic capacitor structure consists of 8 electrodes, each having a plate area of about ½" x ¾", with each being separated from each other by a ceramic layer about 4 mils thick having a dielectric constant of about 10. Except for the use of the green dielectric in preformed sheet form, this method of forming the monolithic capacitor structure is essentially that described in Deyrup U.S. Patent 2,389,420.

In forming monolithic capacitor structure as described above, the silver electrode composition does not attack, blister or perforate the green dielectric sheet during its application thereto or during subsequent stacking, compressing and firing operations. Consequently, no curling, cracking or other related difficulty is experienced in the entire operations by which the fired monolithic structure is obtained.

Example 10

A green dielectric sheet is prepared essentially as described in Example 9, except that the solution in which the glass frit is slurried for casting is an 8.1% solution of a methyl methacrylate polymer (about 65,000 molecular weight) in a solvent consisting of 40% methyl ethyl ketone, 29.3% butanol, 29.3% xylene and 1.4% dibutyl phthalate. Sections of the green sheet are printed as described in Example 1 but using the gold electrode paste of Example 8. The printed sections are than processed as described in Example 9 to give a monolithic multiplate capacitor structure. No curling, blistering or related problems are encountered.

Example 11

A flexible self-supporting green dielectric sheet of a high firing dielectric material is prepared following the general procedure of Example 9. In this instance, however, the dielectric material is a mixture of 112.8 parts $BaZrO_3$, 31.2 parts $MgZrO_3$, 50 parts $BaCO_3$, 12 parts kaolin, 0.6 part $MnO_2$ and 993.7 parts $BaTiO_3$, which mixture is slurried for casting in 1560 parts of the methyl methacrylate polymer solution described in Example 10. Electrode prints are applied to sections of the resulting green sheet, and the sections are then stacked, compressed and fired as described in Example 9. In this instance, however, the metal paste used in printing the electrodes consists of 60% platinum black and 40% of a carrier liquid consisting of a 40% solution of "Nirez" #1135 resin, a polypinene resin of molecular weight of about 870, in diesel fuel having a boiling range of 204 to 315° C. Also, firing of the stacked assembly is effected very slowly over a 4 day period from room temperature to 1315° C. The opposite ends of the monolithic structure with their exposed alternate electrode plates are then printed with a conductive silver paint containing a bismuth oxide-cadmium borate ceramic binder, and the silver paintings are fired on at 760° C.

The area of each electrode plate of a capacitor formed as described above is ½" x ¾" and the plates are separated from each other by ceramic layers having a dielectric constant of about 7000. No curling, cracking, blistering or attack of the green sheet by the platinum electrode composition is encountered during formation of the capacitor, and the latter is free from flaws, perforations and delaminations such as occur when using a metal electrode composition containing a component which is a solvent for the binder component of the green sheet.

Example 12

A monolithic multiplate capacitor is prepared as described in Example 11, except that the metal electrode paste employed consists of 60% rhodium powder and 40% of a carrier liquid consisting of a 40% solution of "Nirez" #1135 resin in diesel fuel having a boiling range of 204 to 315° C. Results essentially similar to those described in Example 11 are obtained.

Example 13

A monolithic capacitor is prepared as generally described in Example 10 except that in preparing the green ceramic sheet, there is used a slurry of the barium titanate mixture in an 18.5% solution of a n-butyl methacrylate polymer (about 300,000 molecular weight), in a solvent mixture consisting of 97% amyl acetate and 3% dibutyl phthalate. The slurry is prepared using an amount of the polymer solution to give a cast sheet containing 25% of the polymer and 75% of the ceramic dielectric material. Also, the electrode prints are made using a paste consisting of 50% palladium powder and 50% of a carrier liquid consisting of a 60% solution of "Nirez" #1100 resin (a polypinene resin of molecular weight of about 770) in an aliphatic petroleum naphtha having a distillation range of 200 to 238° C. A satisfactory monolithic capacitor structure is obtained without objectionable curling, cracking or blistering occurring.

Example 14

No satisfactory fired monolithic capacitor can be produced by the procedure of Example 11 when that procedure is modified to employ in place of the platinum electrode paste of that example, one consisting of 60% platinum black and 40% of a carrier liquid consisting of a 60% solution of hydrogenated rosin in beta-terpineol. This carrier liquid for the platinum exerts a solvent action upon the methyl methacrylate polymer binder of the green sheet. As a consequence, it penetrates and softens the green sheets so that during the printing of the electrodes thereon they buckle and distort badly. Furthermore, during the pressing of the stacked sheets together, large sections of inner sheets are squeezed out of the stack. Similar difficulties are experienced when using noble electrode paste formulated using other carrier liquids which exert a solvent action on the temporary binder of the green ceramic dielectric sheet.

The noble metal components of the electrode pastes of the above examples were of particle sizes in the range 0.1 to 5 microns, and the ceramic dielectric materials of the green ceramic dielectric sheets were of particle sizes in the range 1 to 20 microns. In general, the noble metal components of such electrode pastes should be employed in finely divided powder form with a particle size not exceeding about 50 microns and preferably being in the range 0.1 to 5 microns. The particle size of the ceramic dielectric materials employed in formulating the green dielectric sheet, film or strip, will generally range from 0.1 to 50 microns and preferably will be in the range 1 to 20 microns.

Since it is obvious that many changes and modifications can be made in the above-described details without departing from the nature and spirit of the invention, it is to be understood that the invention is not to be limited to said details except as set forth in the appended claims.

I claim:

1. A noble metal paste composition comprising a 45 to 70% dispersion of a noble metal powder in a liquid carrier comprising a 20 to 75% solution of a polyterpene resin having a molecular weight of 350 to 870, in an aliphatic petroleum naphtha boiling in the range of 150 to 360° C.

2. A noble metal paste according to claim 1 wherein the polyterpene resin is a polypinene resin.

3. A noble metal paste composition comprising a 45 to 70% dispersion of a noble metal powder in a liquid carrier comprising a 20 to 75% solution of a polyterpene resin having a molecular weight of 350 to 870, in an aliphatic petroleum naphtha boiling in the range 150 to 320° C.

4. A noble metal paste composition comprising a 45 to 70% dispersion of a noble metal powder in a liquid carrier comprising a 20 to 75% solution of a polypinene resin having a molecular weight of 350 to 870, in an aliphatic petroleum naphtha boiling in the range 150 to 320° C.

5. A paste composition according to claim 4 wherein the liquid carrier comprises a 30 to 70% solution of a polypinene resin having a molecular weight of 550 to 800, in an aliphatic petroleum naphtha boiling in the range of 170 to 275° C.

6. A paste composition according to claim 4 wherein the polypinene resin has a molecular weight of about 580.

7. A paste composition according to claim 4 wherein the polypinene resin has a molecular weight of about 770.

8. A paste composition according to claim 4 wherein the noble metal is silver.

9. A paste composition according to claim 4 wherein the noble metal is platinum.

10. A paste composition according to claim 4 wherein the noble metal is gold.

11. A paste composition according to claim 4 wherein the noble metal is palladium.

12. A paste composition according to claim 4 wherein the noble metal is rhodium.

References Cited

UNITED STATES PATENTS

| | | | |
|---|---|---|---|
| 2,280,135 | 4/1942 | Ward | 252—514 XR |
| 3,158,503 | 11/1964 | Young | 117—227 XR |
| 3,293,501 | 12/1966 | Martin | 252—514 XR |

JAMES A. SEIDLECK, *Primary Examiner.*

L. B. HAYES, *Assistant Examiner.*